United States Patent

Cowan et al.

(10) Patent No.: US 7,837,555 B2
(45) Date of Patent: Nov. 23, 2010

(54) APPARATUS AND METHOD FOR AWARDING A PRIZE

(75) Inventors: Stephen Cowan, Taren Point (AU); Dean Wright, Taren Point (AU)

(73) Assignee: Paltronics Australasia Pty Limited, Heathcote, New South Wales (AU)

( * ) Notice: Subject to any disclaimer, the term of this patent is extended or adjusted under 35 U.S.C. 154(b) by 1245 days.

(21) Appl. No.: 10/564,967

(22) PCT Filed: Jul. 16, 2004

(86) PCT No.: PCT/AU2004/000964

§ 371 (c)(1),
(2), (4) Date: Jan. 18, 2006

(87) PCT Pub. No.: WO2005/008514

PCT Pub. Date: Jan. 27, 2005

(65) Prior Publication Data

US 2006/0189366 A1    Aug. 24, 2006

(30) Foreign Application Priority Data

| Jul. 18, 2003 | (AU) | 2003903769 |
| Oct. 21, 2003 | (AU) | 2003905792 |
| Feb. 26, 2004 | (AU) | 2004900978 |
| May 10, 2004 | (AU) | 2004902459 |
| May 10, 2004 | (AU) | 2004902460 |
| May 10, 2004 | (AU) | 2004902465 |
| May 10, 2004 | (AU) | 2004902469 |

(51) Int. Cl.
*G06F 17/00* (2006.01)
(52) U.S. Cl. .............. 463/27; 463/25; 463/26
(58) Field of Classification Search .............. 463/25–28
See application file for complete search history.

(56) References Cited

U.S. PATENT DOCUMENTS 5,116,055 A    5/1992    Tracy (Continued)

FOREIGN PATENT DOCUMENTS

AU    714299 B1    12/1999

(Continued)

OTHER PUBLICATIONS

International Search Report for PCT/AU2004/000964, Dated Oct. 18, 2004, 3 pages.

* cited by examiner

*Primary Examiner*—Dmitry Suhol
*Assistant Examiner*—Werner Garner
(74) *Attorney, Agent, or Firm*—Sterne, Kessler, Goldstein & Fox P.L.L.C.

(57) ABSTRACT

Apparatus (1) and associated methods are disclosed for determining the award of a plurality of prizes having respective prize values. The apparatus includes memory (2) for storing data indicative of a current prize value; an input device (3) being responsive to input signals from a respective plurality of gaming terminals (4) for providing an increment signal; a controller (5) for defining a prize value between upper and lower prize values and for incrementing an accumulated value toward the current prize value in response to the increment signal; a comparator (7) being responsive to the current prize value and the accumulated value for determining if the current prize value is to be awarded and, if so, generating an award signal that actuates the controller (5) to define a second prize value. Methods are disclosed in which, upon payment of a prize, the accumulated value is reset to the prize value or the upper or lower prize value and in which subsequent prize values are selected between a preceding prize value and either the upper prize value or the lower prize value.

26 Claims, 4 Drawing Sheets

U.S. PATENT DOCUMENTS

| | | |
|---|---|---|
| 5,280,909 A | 1/1994 | Tracy |
| 5,393,057 A | 2/1995 | Marnell, II |
| 6,012,982 A | 1/2000 | Piechowiak et al. |
| 6,062,981 A | 5/2000 | Luciano, Jr. |
| 6,110,043 A | 8/2000 | Olsen |
| 6,155,925 A | 12/2000 | Giobbi et al. |
| 6,283,855 B1 | 9/2001 | Bingham |
| 6,312,333 B1 | 11/2001 | Acres |
| 6,358,149 B1 | 3/2002 | Schneider et al. |
| 6,471,591 B1 | 10/2002 | Crumby |
| 6,565,434 B1 | 5/2003 | Acres |
| 6,585,592 B1 | 7/2003 | Crumby |
| 6,656,048 B2 | 12/2003 | Olsen |
| 2003/0036429 A1 | 2/2003 | Witty et al. |
| 2003/0162588 A1 | 8/2003 | Brosnan et al. |
| 2003/0236116 A1* | 12/2003 | Marks et al. .................. 463/16 |
| 2004/0053679 A1 | 3/2004 | Getz et al. |
| 2004/0087368 A1 | 5/2004 | Gauselmann |
| 2005/0079911 A1* | 4/2005 | Nakatsu ....................... 463/26 |

FOREIGN PATENT DOCUMENTS

| | | |
|---|---|---|
| AU | 2003/203674 B1 | 10/2003 |
| AU | 2003/246319 B2 | 10/2003 |
| AU | 783417 B2 | 10/2005 |
| EP | 0 874 337 A1 | 10/1998 |
| GB | 2 139 390 A | 11/1984 |
| JP | 2001/195359 A | 7/2001 |
| WO | WO 96/12262 A1 | 4/1996 |
| WO | WO 01/15790 A1 | 3/2001 |
| WO | WO 02/103586 A1 | 12/2002 |
| WO | WO 2005/008514 A1 | 1/2005 |
| WO | WO 2005/042123 A1 | 5/2005 |
| WO | WO 2005/083599 A1 | 9/2005 |
| WO | WO 2005/107899 A1 | 11/2005 |
| WO | WO 2005/107901 A1 | 11/2005 |
| WO | WO 2005/107913 A1 | 11/2005 |
| WO | WO 2005/107914 A1 | 11/2005 |

APPARATUS AND METHOD FOR AWARDING A PRIZE

FIELD OF INVENTION

The present invention relates to an apparatus and method for awarding a prize.

The invention has been developed primarily for use with a plurality of interlinked gaming machines in a gaming establishment and will be described hereinafter with reference to this application. However, the invention is not limited to that particular field of use and is also suitable for use with online gaming, gaming machines that are distributed over a plurality of gaming establishments, lotto, pools, lotteries, art unions, bingo, raffles and other games involving one or more wagers being placed upon an outcome having a finite probability of occurring.

BACKGROUND

It is known to "link" gaming machines to provide a number of additional functionalities. This includes the ability to control the awarding of a prize, as the pool of available funds is greater and the amount of funds available is known rather than having to be estimated. Another functionality of interlinked gaming machines is that secondary gaming is possible. For example, for a given group of interlinked gaming machines, a central display provides the gamers with a visual indication of a presently available jackpot prize that is being incrementally increased as the gamers operate the interlinked gaming machines. It is known by the gamers that the prize will be awarded when it is incremented to a randomly selected value that is less than a predefined value. Typically, the predefined value will also be visually indicated to the gamers by the display.

The use of such functionality is intended to provide additional impetus to the gamers to play the machines and thereby win the jackpot prize in addition to any prize available to be awarded by the respective machine. However, with the increasing sophistication of the gamers and their approach to gaming, the interest in the jackpot prize has diminished.

The discussion of the prior art within this specification is to assist the addressee to understand the invention and is not an admission of the extent of the common general knowledge in the field of the invention and is included without prejudice.

SUMMARY OF THE INVENTION

It is an object of the present invention to overcome, or at least substantially ameliorate, one or more of the disadvantages of the prior art or at least to provide a useful alternative.

According to a first aspect of the invention there is provided an apparatus for determining the award of a plurality of prizes having respective prize values, the apparatus including:

memory for storing data indicative of a current prize value;

an input device being responsive to input signals from a respective plurality of gaming terminals for providing an increment signal;

a controller for defining the current prize value as a first of the prize values and being responsive to the increment signal for incrementing an accumulated value toward the current prize value; and a comparator being responsive to the current prize value and the accumulated value for determining if the current prize value is to be awarded and, if so, generating an award signal that actuates the controller to define the current prize value as a second of the prize values.

Preferably, the prize values fall within a range between an upper prize value and a lower prize value and the memory also contains data indicative of the upper prize value and the lower prize value. More preferably, the controller is responsive to the upper prize value and the lower prize value for determining the second of the prize values. That is, the controller sequentially determines the prize values and, in turn, has the data in the memory updated to reflect the latest determination, the current prize value. Even more preferably, a prize value is determined to fall alternately between:

the current prize value and the upper prize value; and the current prior prize value and the lower prize value.

In other embodiments, upon determination that the current prize value is to be awarded, the accumulated value is reset to one or other of the upper prize value or the lower prize value. More preferably, the accumulated value is alternately reset to the upper prize value and the lower prize value.

Preferably also, the terminals are respective gaming machines. However, in other embodiments, the terminals are computer devices such as stand alone desktop computers. More preferably, the desktop computers are linked to the apparatus via web-enabled or other online interfaces. In still further embodiments, the terminals are both gaming machines and online computing devices.

In a preferred form, the apparatus includes a payout device that is responsive to the increment signal and the award signal for selecting the terminal to which the prize is awarded. More preferably, each terminal includes a gaming balance and the payout device, upon selecting the terminal, credits the respective gaming balance. Even more preferably, the payout device credits the gaming balance by the accumulated value.

Preferably, the apparatus includes a display driver for providing persons using the terminals with a visual indication of the accumulated value. In the case of a gaming establishment where the terminals are gaming machines, the display driver is a dedicated hardware and software device that drives an LED display that is prominently located within the establishment. In other embodiments, the LED display is substituted with one or more spaced apart plasma screens, video projectors, television monitors or other display devices. It will be appreciated that gaming machines typically include a dedicated gaming display for providing the gamer with visual feedback on the progress of the game. In some embodiments, the display device is provided by the dedicated gaming display.

In those embodiments where the terminals are remotely connected computing devices such as personal computers, the display driver is coded into the communications protocol. For example, for a web-based delivery, the driver is provided in HTML and as part of the web page or other method for displaying content that delivers the game to the terminal. In other embodiments alternative languages are used.

Preferably also, the driver also provides persons using the terminals with a visual indication of one or more of:

the upper prize value;

the lower prize value; and whether the accumulated value is incrementing toward the upper or the lower prize value.

In a preferred form, the comparator is part of the controller. However, in other embodiments these components are separately implemented.

According to a second aspect of the invention there is provided an apparatus for determining the award of a plurality of prizes having respective prize values that fall between an upper prize value and a lower prize value, the apparatus including:

memory for storing data indicative of a current prize value;

an input device being responsive to input signals from a respective plurality of gaming terminals for providing an increment signal;

a controller for defining the current prize value as a first of the prize values and being responsive to the increment signal for incrementing an accumulated value toward the current prize value, whereby the first prize value lies between one of the accumulated value and the upper prize value and the accumulated value and the lower prize value; and a comparator being responsive to the current prize value and the accumulated value for determining if the current prize value is to be awarded and, if so, generating an award signal that actuates the controller to define the current prize value as a second of the prize values, whereby the second prize value lies between the other of the accumulated value and the upper prize value and the accumulated value and the lower prize value.

In the preferred embodiments, alternate prize values result in the accumulated value alternately incrementing upwardly and downwardly. That is, a prize value is determined to fall alternately between:

the current prize value and the upper prize value; and the current prior prize value and the lower prize value.

In other embodiments, upon determination that the current prize value is to be awarded, the accumulated value is reset to one or other of the upper prize value or the lower prize value. More preferably, the accumulated value is alternately reset to the upper prize value and the lower prize value.

According to a third aspect of the invention there is provided an apparatus for determining the award of a plurality of prizes having respective prize values that fall between an upper prize value and a lower prize value, the apparatus including:

memory for storing data indicative of a current prize value;

an input device being responsive to input signals from a respective plurality of gaming terminals for providing an increment signal;

a controller for defining the current prize value as a first of the prize values and an accumulated value as one of the upper prize value or the lower prize value, the controller being responsive to the increment signal for incrementing the accumulated value toward the current prize value; and a comparator being responsive to the current prize value and the accumulated value for determining if the current prize value is to be awarded and, if so, generating an award signal that actuates the controller to define the current prize value as a second of the prize values and to reset the accumulated value to the other of the upper prize value or the lower prize value.

According to a fourth aspect of the invention there is provided a method for determining the award of a plurality of prizes having respective prize values, the method including:

storing data indicative of a current prize value;

being responsive to input signals from a respective plurality of gaming terminals for providing an increment signal;

providing a controller for defining the current prize value as a first of the prize values and being responsive to the increment signal for incrementing an accumulated value toward the current prize value; and being responsive to the current prize value and the accumulated value for determining if the current prize value is to be awarded and, if so, generating an award signal that actuates the controller to define the current prize value as a second of the prize values.

According to a fifth aspect of the invention there is provided a method for determining the award of a plurality of prizes having respective prize values that fall between an upper prize value and a lower prize value, the apparatus including:

storing data indicative of a current prize value;

being responsive to input signals from a respective plurality of gaming terminals for providing an increment signal;

providing a controller for defining the current prize value as a first of the prize values and being responsive to the increment signal for incrementing an accumulated value toward the current prize value, whereby the first prize value lies between one of the accumulated value and the upper prize value and the accumulated value and the lower prize value; and being responsive to the current prize value and the accumulated value for determining if the current prize value is to be awarded and, if so, generating an award signal that actuates the controller to define the current prize value as a second of the prize values, whereby the second prize value lies between the other of the accumulated value and the upper prize value and the accumulated value and the lower prize value.

According to a sixth aspect of the invention there is provided a method for determining the award of a plurality of prizes having respective prize values that fall between an upper prize value and a lower prize value, the method including:

storing data indicative of a current prize value;

being responsive to input signals from a respective plurality of gaming terminals for providing an increment signal;

providing a controller for defining the current prize value as a first of the prize values and an accumulated value as one of the upper prize value or the lower prize value;

being responsive to the increment signal for incrementing the accumulated value toward the current prize value; and being responsive to the current prize value and the accumulated value for determining if the current prize value is to be awarded and, if so, generating an award signal that actuates the controller to define the current prize value as a second of the prize values and to reset the accumulated value to the other of the upper prize value or the lower prize value.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENTS

Figure 1:
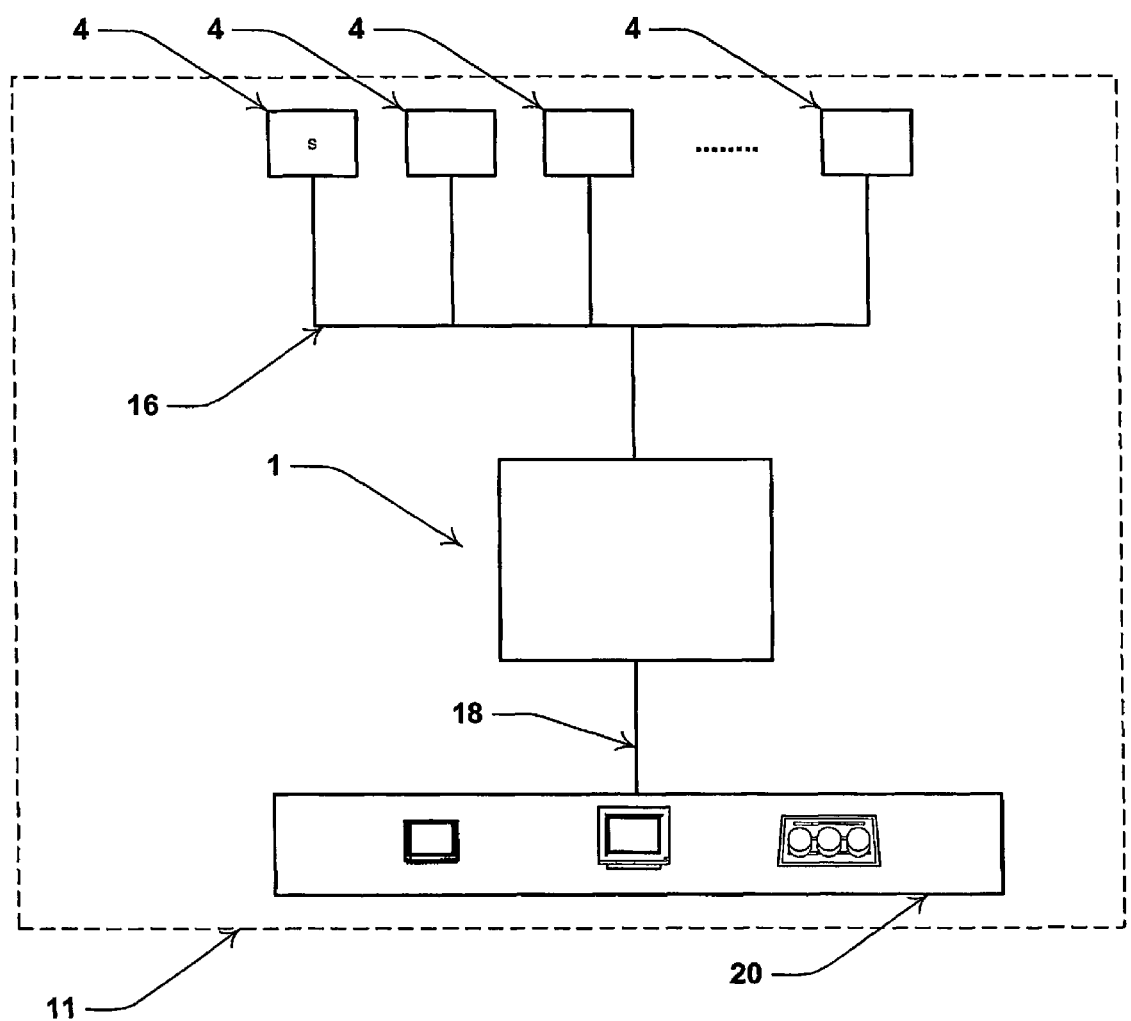
FIG. 1 is a schematic view of a gaming network including an apparatus according to the invention.
Figure 2:
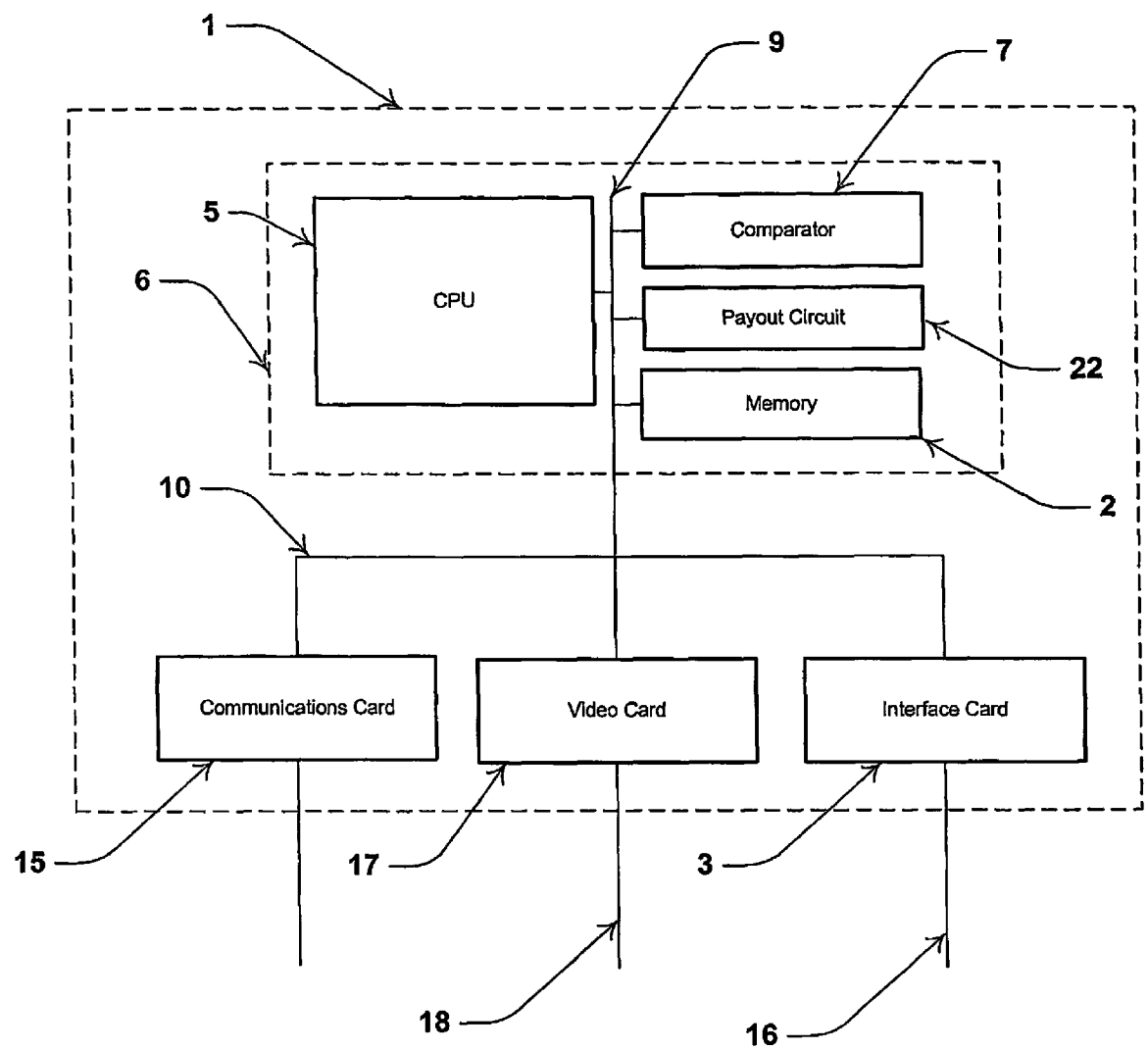
FIG. 2 is a schematic view in more detail of the apparatus shown in FIG. 1.

Referring to FIG. 2 there is provided an apparatus 1 for determining the award of a plurality of prizes having respective prize values. Apparatus 1 includes memory in the form of solid state memory 2 for storing data indicative of a current prize value. An input device in the form of an interface card 3 is responsive to input signals from a respective plurality of gaming terminals 4—as shown in FIG. 1—for providing an increment signal. A controller, in the form of a CPU 5 that is mounted to a motherboard 6, defines the current prize value as a first of the prize values and is responsive to the increment signal for incrementing an accumulated value toward the current prize value. A comparator, in the form of a local processor 7 on board 6, is responsive to the current prize value and the accumulated value for determining if the current prize value is to be awarded and, if so, generating an award signal that actuates CPU 5 to define the current prize value as a second of the prize values.

In other embodiments, card 3 is a network card designed to retrieve the appropriate information from a plurality of gaming devices, whether those devices be stand alone gaming machines, personal computers running gaming software, or the like.

The prize values fall within a range between an upper prize value and a lower prize value and memory 2 also contains data indicative of the upper prize value and the lower prize value. CPU 5 selectively accesses memory 2 and is responsive to the upper prize value and the lower prize value for determining the second of the prize values. That is, prize values, in this embodiment, are not fully predetermined. Rather, CPU 5 sequentially determines the prize values and, in turn, has the data in memory 2 updated to reflect the latest determination: the current prize value. The rule followed by CPU 5 is that a prize value is determined to fall alternately between:

the current prize value and the upper prize value; and
the current prior prize value and the lower prize value.

Motherboard 6 includes a communications bus 9 for accommodating the communication between the various computing components shown.

It will be appreciated that FIG. 2 is highly schematic and is intended to provide the skilled addressee with an understanding of the functionality provided by apparatus 1 and the interaction between the components illustrated. It would be understood from the teaching herein that those functionalities and interactions are able to be implemented in other ways. For example, for the purposes of clarity, the functionality of comparator 7 is, in this embodiment, is separated from that of CPU 5. However, in practice, CPU 5 performs both functions.

Card 3 is a dedicated hardware device that is linked to bus 9 by an external communications bus 10. Both these buses are schematic representations of a plurality of digital lines. In some embodiments, bus 10 includes one or more analogue lines—for video and audio—in addition to the digital lines.

As shown in FIG. 1, terminals 4 are respective gaming machines that are co-located in a single gaming establishment 11. While only four terminals are shown, it is usual to have many more than this, typically ten, linked by apparatus 1. Where it is desired to link greater numbers of terminals, use is made of a structured network of apparatus 1. To this end, apparatus 1 includes a network card or communications card 15, as shown in FIG. 2. In some embodiments, card 15 is configured for wireless communication.

Terminals 4 are typically physically arranged in groups or lines and are presented to make them easily accessible for gamers. Each terminal includes a dedicated interface card (not shown) to provide and receive predetermined communications signals to a 10 Mbits/s Cat 5 communications bus 16. In other embodiments, use is made of an existing network, such as CMS, to effect the required communications.

Bus 16 is also linked to card 3 for allowing apparatus 1 to communicate with terminals 4. It will be appreciated that terminals 4 do not communicate with each other, but only with apparatus 1. However, the communication between each terminal and apparatus 1 is two-way.

In practice, apparatus 1 is located away from terminals 4 and in a location that is easily accessible by technical staff of the establishment. For example, in some embodiments, apparatus 1 takes the form of a networked server and is located together with other servers and computer equipment in a dedicated room within the establishment.

Apparatus 1 includes a display driver in the form of a video card 17 for providing gamers using one or more of terminals 4 with a visual indication of the accumulated value. Card 17 is provided with command and data signals by CPU 5 via bus 9 and 10. These signals are processed by the circuitry and software available on the card to provide an output signal that is, in this embodiment, provided to a video cable 18.

Cable 18 provides a video feed for a video display 20. In this embodiment, display 20 is an LED display that is prominently located within establishment 11 near terminals 4. This allows the gamers utilising terminals 4 to easily determine the quantum of the accumulated value. In this embodiment, display 20 also provides the gamers with a visual indication of one of the upper prize value and the lower prize value and whether the accumulated value is incrementing upwardly or downwardly. This will be described in more detail below with reference to FIGS. 3 and 4.

In other embodiments, the LED display is substituted with one or more spaced apart plasma screens, video projectors, television monitors, CRT projectors or other display devices. The use of spaced apart display devices is particularly advantageous where there are many terminals 4 within the establishment, or where those terminals are distributed widely within the establishment. For those embodiments where terminals 4 are not all in the same establishment, then provision is made for separate displays in the separate establishments.

The use of display 20 is advantageous as it provides information to the gamers and allows them to derive more entertainment and enjoyment for a given wager. It is also advantageous to have display 20 as a separate component that is prominently located, as that provides open information to potential gamers as to extra benefits of terminals 4 over prior art terminals.

In other embodiments, a separate display 20 is not used. That is, the visual indication is provided as a digital signal via bus 16 directly to terminals 4. In turn, this signal is received by the respective interface cards in the terminals and displayed on the screens of the terminals. In further embodiments use is made of both a separate display 20 and a display on each of the individual terminals.

There are also embodiments where not all terminals 4 are located at within the same establishment. That is, terminals 4 are located across at least two different establishments.

Apparatus 1 includes a payout device in the form of a payout circuit 22 on board 6, which is responsive to the increment signal and the award signal for selecting the terminal to which the prize is awarded. It will be appreciated that each terminal 4 includes data indicative of a gaming balance that is available to the gamer using that terminal. Circuit 22, upon selecting the terminal, credits the respective gaming balance. In this embodiment circuit 22 credits the gaming balance by the accumulated value. In other embodiments the gaming balance is credited by a different amount. In any event, once the gamer has decided to cease the gaming session, the credit balance is redeemed in the usual manner. This includes, by way of example, a cash payout from the terminal, the update of the gamer's smartcard by the terminal, or the gamer seeking the payment from a cashier or other centralised payment point. If the accumulated amount is large, the most practical ways of affecting a redemption requested by the gamer is to:

1. Affect a manual payment;
2. Transfer the value to the players terminal;

3. If available, print a ticket using the terminals ticket printing device;
4. Credit the player's credit card or online wallet;
5. Transfer the money to a mobile device with technology for allowing such a transfer—such as, but not limited to, a cellular telephone, a PDA, or a mobile computer—for redemption at a later time.

Figure 5:
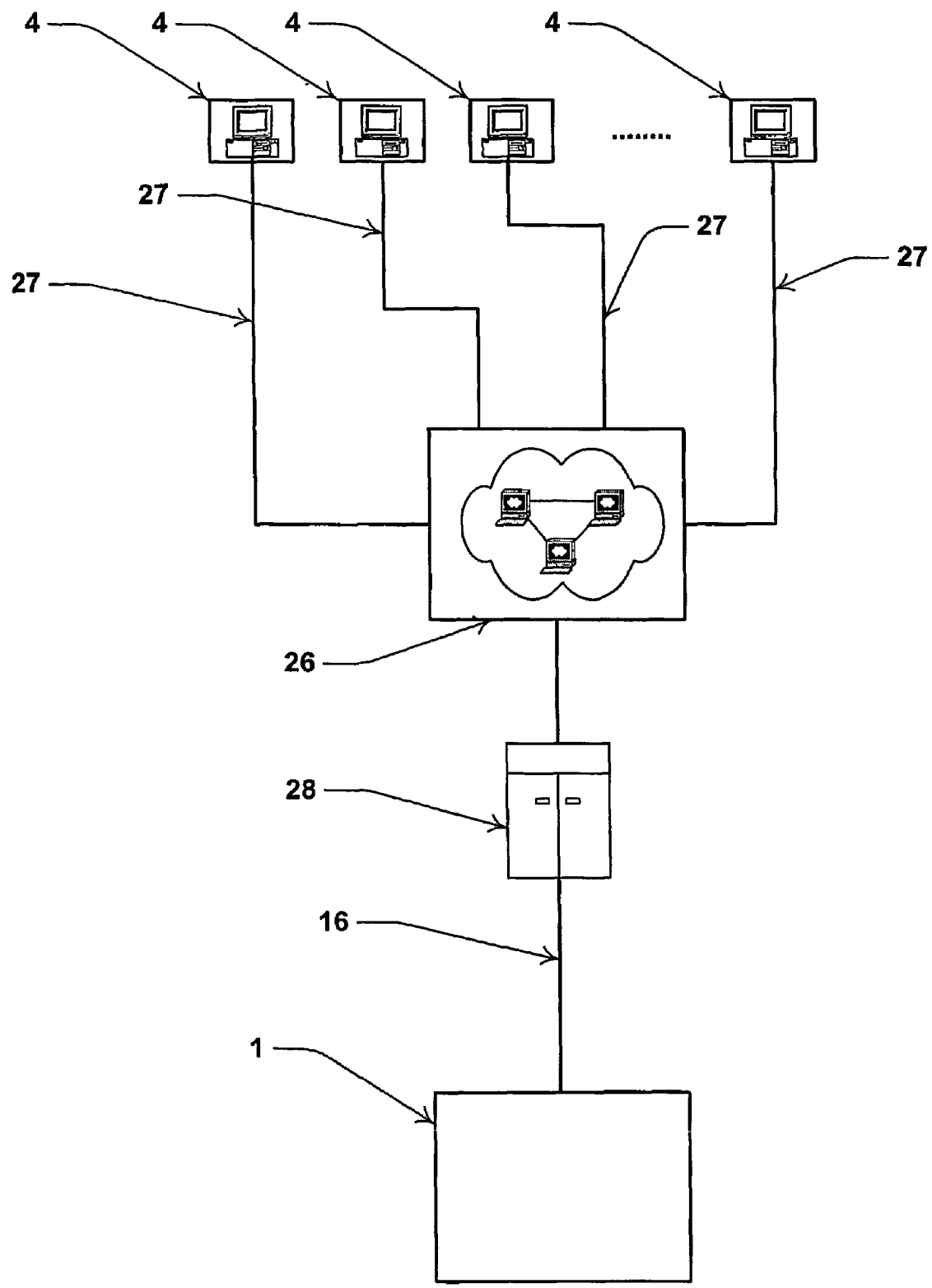
FIG. 5 is a schematic view of an online gaming network including an apparatus according to the invention.

In other embodiments, such as that shown in FIG. 5, terminals 4 are computer devices such as stand alone desktop computers that are remotely located. In this embodiment, each computer is at the residence of the respective gamers. The computers are each linked to the internet 26 via telephone lines 27. Apparatus 1, on the other hand, is linked to an internet server 28 via bus 16.

Server 28 allows communication between terminals 4 and apparatus 1 to provide the same functionality as that achieved by the FIG. 1 embodiment. However, in this case, the delivery of the information is browser based.

In some embodiments, apparatus 1 communicates both with terminals that are gaming machines and terminals that are remotely located desktop computers.

It will be appreciated by those skilled in the art, from the teaching herein, that server 28 will also allow the invention to be performed with terminals that are laptop computers, mini-computers, PDA's and other computing devices with internet, 3 G or WAP capability. Moreover, in some embodiments, server 28 is able to interact with gamers by way of the cellular telephone network.

Reference is again made to FIG. 1 and FIG. 2. In use, the gamers operating terminals 4 are participating in a game of chance that is contingent upon the predetermined virtual spacing on a screen of a number of icons. Once the gamer establishes a credit balance with the terminal, by one of various means, it is possible for the gamer to initiate a gaming sequence. After the sequence has played out, and the result displayed on the screen of the terminal, the terminal then provides the input signal on bus 16. This input signal includes a multi bit string of information, including a unique identifier for the terminal and the quantum of the wager placed upon the gaming sequence that was completed. When respective gamers are simultaneously playing the terminals, a stream of input signals are received by card 3.

In addition to the individual games of chance, the gamers are also participating in an additional group game of chance, in that they are eligible to win a "jackpot" amount. The two games are independently operated in that the probability of a gamer winning one of the games does not affect their probability of winning the other.

As mentioned above, memory 2 includes data indicative of the current prize value, as well as the upper prize value and the lower prize value. The current prize value is the value of the jackpot to be next awarded. The upper prize value is the maximum value of the prize to be awarded, while the minimum prize value is the minimum value of the prize to be awarded.

At start up, CPU 5 is programmed to default the accumulated value to one of the upper prize value or the lower prize value, and to control card 17 to ensure that the default accumulated value is visually displayed upon display 20. This amount is displayed as being the value of the jackpot that is available to be awarded to a gamer. For this embodiment, it is assumed that the default is the lower prize value. For this specific example the accumulated value—that is, the value displayed in area 31 of FIG. 3—is initially $10,000 and ramps upwardly as the gamers operate terminals 4.

The CPU also determines the current prize value by randomly or pseudo randomly selecting a value between the minimum and maximum value and having this stored in memory 2. In other embodiments, however, the initial current value is selected in accordance with a predefined algorithm.

In this specific example, the prize value was determined to be $13,398.39. The current prize value is not displayed or otherwise communicated to the gamers.

As the gamers operate the terminals and the input signals are provided to card 3, the increment signal is generated with a weighting that is dependent upon the quantum of the wager undertaken by the gamer. CPU 5 is responsive to the increment signal to increment the accumulated value by the weighting in a direction toward the current prize value. At this part of the cycle, the increment is upwardly.

Figure 3:
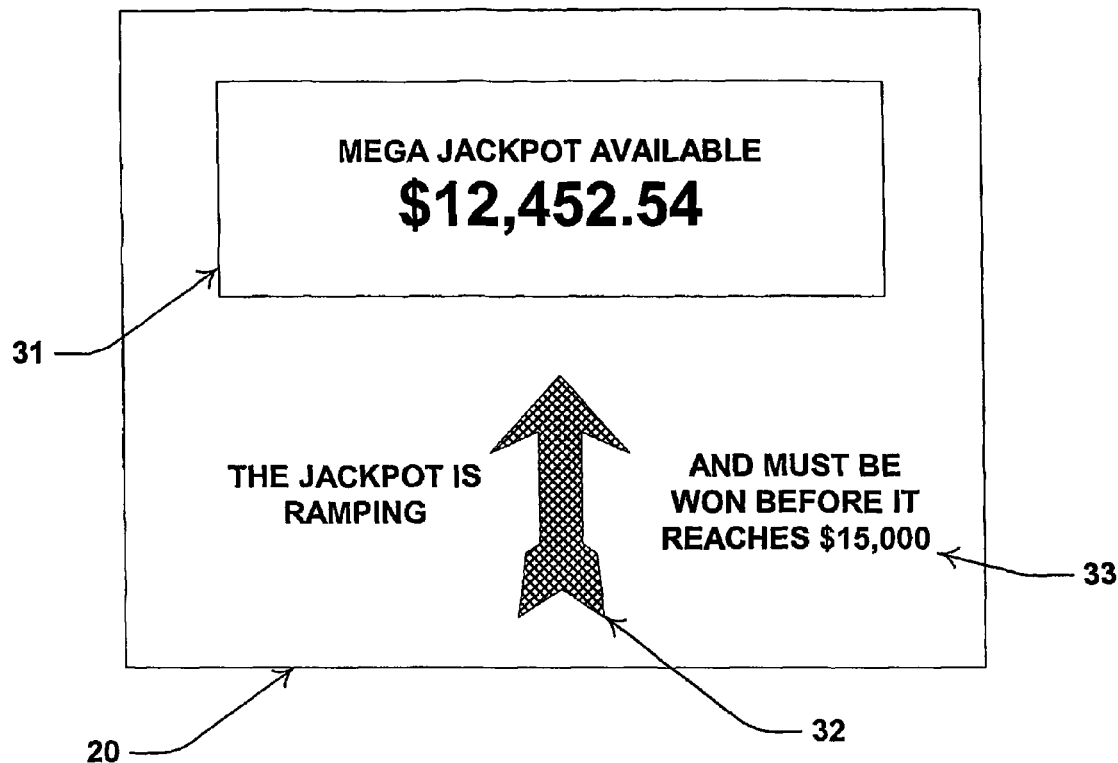
FIG. 3 is a schematic view of a display that is driven by the apparatus of FIG. 2.
Figure 4:
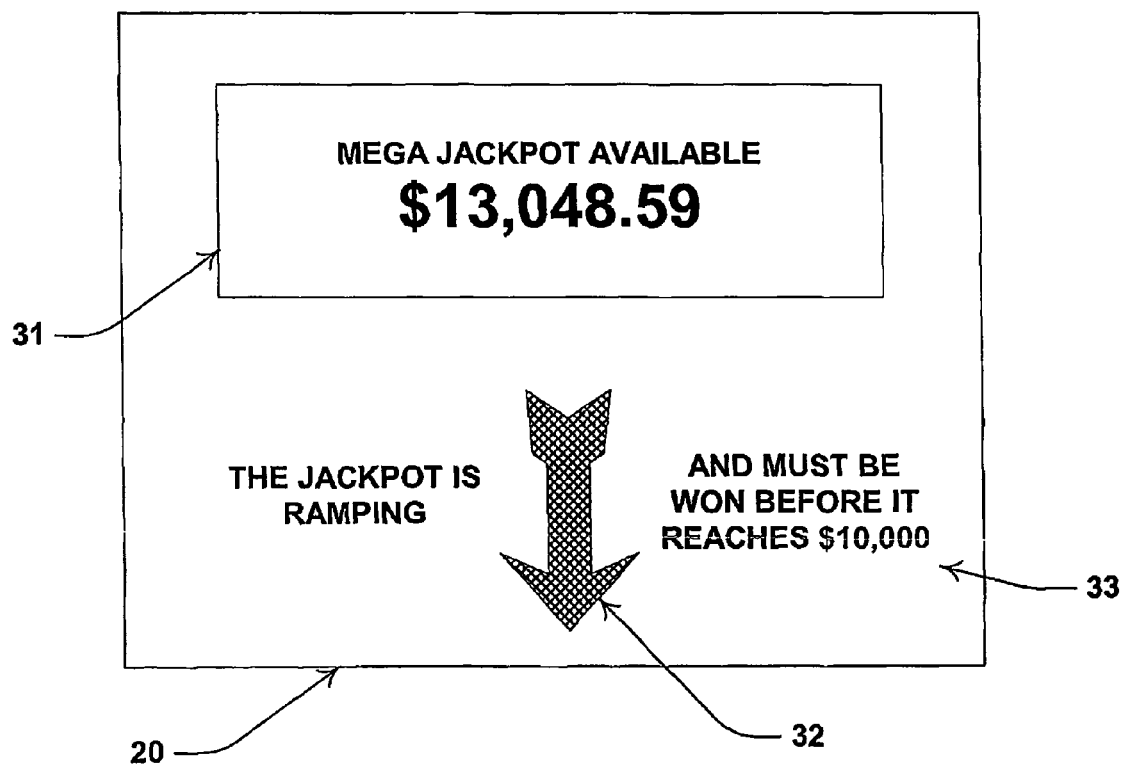
FIG. 4 is a further schematic view of the display of FIG. 3.

The updated accumulated value is displayed on display 20 to ensure that the gamers have access to the revised information. The more the gamers play, and the more they wager, the faster that the accumulated value will increment. An example of display 20 at this stage of a cycle is illustrated in FIG. 3. More particularly, the accumulated value is illustrated in area 31 as $12,452.54, while the upward increment of the accumulated value is indicated by the upward orientation of arrow 32. The upper prize value, in this embodiment, is $15,000 and the lower prize value is $10,000. This information is alternately shown in area 33 of display 20, as indicated by FIGS. 3 and 4 respectively.

Processor 7 is responsive to the current prize value—which is presently $13,398.39—and the accumulated value for determining when the current prize value is to be awarded. In this embodiment, processor 7 generates the award signal when the difference between the accumulation value and the current value changes sign. That is, processor 7, after each change to the accumulation value, determines the difference between the two values. At the point where the one that was initially larger—in this case the current prize value—is now the smaller is when the award signal is generated.

The award signal is used by CPU 5 as an initiator for a number of actions. The first action is to determine which of the terminals was the site of the wager that results in the award signal being generated. This determination is made by reference to the increment signal, which in turn includes data that was extracted from the corresponding input signal. With this done, CPU 5 communicates with the terminal, via card 3, to credit the balance by the current prize value. In other embodiments the balance is credited by an amount other than the current prize value.

The next action is to reset the current prize value. CPU 5 is responsive to the upper prize value and the lower prize value for determining the next of the prize values. At this point of the cycle, CPU 5 randomly or pseudo randomly selects a value that lies between the current prize value and the lower prize value and updates the data in memory 2 to redefine the current prize value. In this example, the current prize value is redefined as $11,390.99. CPU 5 is then responsive to subsequent increment signals to progress the accumulation value toward the current prize value.

Processor 7 is also active in determining the timing of the next award signal. Once that occurs, CPU responds accordingly and:
1. Awards the prize by crediting the appropriate balance;
2. Resets the current prize value to fall randomly between the current prize value and the upper prize value.

This sequence repeats, in that CPU 5 determines the sequentially prize values and, in turn, has the data in memory 2 updated to reflect the latest determination. The rule followed by CPU 5 is that a subsequent prize value is determined to fall alternately between:

the current prize value and the upper prize value; and the current prior prize value and the lower prize value.

In this embodiment, the accumulated value is never reset and simply changes the direction of accumulation once the next current prize value is determined. That is, the accumulated value will alternately progress toward the upper prize value and the lower prize value, changing direction when it reaches the current prize value.

The weighting of the increment to the accumulation value is also dependent upon the difference between the successive accumulation values. That is, the operator of apparatus 1 must ensure that the return percentage to the gamers is maintained within the relevant regulated limits. Accordingly, if the difference is large, then the weighting is greater so that each increment is larger than would be the case if the difference were small. It also ensures that the operator is able to gain up-to-date information about the profit margins provided by apparatus 1, be they positive or negative. For example, the operator may be prepared to offer the embodiment as a loss leader, on the basis that those losses are contained to a predetermined percentage. In that case, the return percentage provided by the primary games played on terminals 4 may be lower to ensure that the overall return is within the required parameters.

In other embodiments the rules followed by CPU 5 when determining a prize value is different than that suggested above. For example, in one specific embodiment a prize value is determined randomly or pseudo randomly to fall between the lower and the upper prize value. However, the accumulation value is reset alternately to the upper prize value and the lower prize value. That is, following the issue of an award signal, the incrementing of the accumulation value toggles between a positive increment and a negative increment.

In overview, the preferred embodiments of the invention the current prize value is set randomly and the accumulated value set initially at a minimum value such that it increments upwardly—referred to as being a progressive jackpot in that it "ramps up"—to the current prize value. Once the accumulated value is equal to or greater than the current prize value, the current prize value is awarded to the gamer who was responsible for that increment of the accumulated value. In the next jackpot game, the current prize value is reset, again randomly, while the accumulated value is set to a maximum value such that it increments downwardly—referred to as being a regressive jackpot in that it "ramps down"—to the current prize value. Once the accumulated value is equal to or less than the current prize value, the current prize value is awarded to the gamer who was responsible for that increment of the accumulated value.

In addition to the embodiments explicitly disclosed, the invention may also be embodied in, or in combination with, systems such as those disclosed in our copending Australian patent application numbers 2004902460, 2003905792, 2004902465, 2004900978, 2004902469 and 2004902459, the contents of which are herein incorporated by reference.

With prior art system—where typically the accumulated value is always reset to the lower limit—the gamer is more likely to lose interest until such time as the accumulated value rises considerably, assuming that it will do so prior to the current prize value be reached. What has been found is that gamers usually do not take an active interest until the accumulated value is greater than about the half way point between the possible minimum and maximum values.

The preferred embodiments of the invention allow these disadvantages to be overcome by offering a regressive jackpot. Such a jackpot provides the gamers with the ability to wager on the award of that jackpot while there is a chance that it is at or near the maximum possible value. Additionally, even where use is made of a progressive jackpot, this is in the alternative with the regressive jackpot, so the gamers are able to influence the return to the regressive jackpot through their gaming actions, while still gaining the opportunity to win the progressive jackpot currently being offered.

A significant advantage of the preferred embodiments is that the interest of the gamer is maintained due not only to the variation in the jackpot value, but also due to the variation in the increment or decrement of the accumulation value that is displayed.

Although the invention has been described with reference to a specific examples it will be appreciated that by those skilled in the art that it may be embodied in many other forms.

The invention claimed is:

1. Apparatus for determining an award of a plurality of prizes between an upper limit value and a lower limit value, the upper limit value being greater than the lower limit value, including:

memory for storing data indicative of a current prize value, the upper limit value, and the lower limit value;

an input device responsive to input signals from a plurality of gaming terminals for providing an increment signal;

a controller configured to define the current prize value, the controller being additionally configured to be responsive to the increment signal for incrementing an accumulated value toward the current prize value; and a comparator that compares the current prize value and the accumulated value to determine, for a first prize determination process, if the current prize value is to be awarded and, if so, generates an award signal;

wherein the controller is configured to, following a determination that the current prize value is to be awarded, reset the accumulated value to either the upper limit value or the lower limit value, such that for consecutive prize determination processes the controller alternates between resetting the accumulated value to the upper limit value and resetting the accumulated value to the lower limit value, and define a new current prize value for a subsequent prize determination process.

2. Apparatus according to claim 1, wherein the controller alternates between a mode wherein the accumulated value increments upwardly toward the current prize value, and a mode wherein the accumulated value increments downwardly toward the current prize value.

3. Apparatus according to claim 1, wherein the terminals are respective gaming machines.

4. Apparatus according to claim 1, wherein the terminals are computer devices such as stand alone desktop computers.

5. Apparatus according to claim 4, wherein the computer devices are linked to the apparatus via web-enabled or other online interfaces.

6. Apparatus according to claim 1, wherein the terminals include gaming machines and computer devices.

7. Apparatus according to claim 1, further including a payout device that is responsive to the increment signal and the award signal for selecting the terminal to which the prize is awarded.

8. Apparatus according to claim 7, wherein each terminal includes a gaming balance and the payout device, upon selecting the terminal, credits the respective gaming balance.

9. Apparatus according to claim 8, wherein the payout device credits the gaming balance by the accumulated value.

10. Apparatus according to claim 1, further including a display driver for providing persons using the terminals with a visual indication of the accumulated value.

11. Apparatus according to claim 10, wherein the terminals including gaming machines located in an establishment, the display driver is a dedicated hardware and software device that drives an LED display that is prominently located within the establishment.

12. Apparatus according to claim 10, wherein the terminals include computer devices and the display driver is coded into communications protocol between the apparatus and the computer devices.

13. Apparatus according to claim 10, wherein the driver also provides persons using the terminals with a visual indication of one or more of:
- the upper limit value;
- the lower limit value; and
- whether the accumulated value is incrementing toward the upper or the lower limit value.

14. Apparatus according to claim 1, wherein the comparator is part of the controller.

15. A method for determining the award of a plurality of prizes, comprising:
- storing in a memory device data indicative of a current prize value;
- operating an input device to be responsive to input signals from a respective plurality of gaming terminals for providing an increment signal;
- operating a controller to define a current prize value and to be responsive to the increment signal for incrementing an accumulated value toward the current prize value;
- operating a comparator to be responsive to the current prize value and the accumulated value for determining if the current prize value is to be awarded for a first prize determination process and, if so, generating an award signal; and
- operating the controller to be responsive to the award signal for defining a new current prize value for a subsequent prize determination process;
- wherein the controller is configured, for consecutive prize determination processes, to alternate between incrementing the accumulated value upwardly toward the current prize value, and incrementing the accumulated value downwardly toward the current prize value.

16. A method for determining the award of a plurality of prizes in a gaming system, comprising:
 (a) monitoring wagers from multiple terminals of the gaming system;
 (b) setting a current prize value for a given prize determination process;
 (c) incrementing an accumulated value in accordance with the wagers until the accumulated value is equal to or beyond a threshold;
 (d) identifying the terminal whose wager resulted in the accumulated value being equal to or beyond the threshold;
 (e) setting a new current prize value for a subsequent prize determination process; and
 (f) repeating steps (b) through (e);
 wherein, for consecutive prize determination processes, the process alternates between incrementing the accumulated value upwardly toward the current prize value, and incrementing the accumulated value downwardly toward the current prize value.

17. The method according to claim 16, wherein the threshold is equal to the current prize value.

18. The method according to claim 17, further comprising defining an upper limit value and a lower limit value, wherein steps (b) and (e) comprise setting the current prize value between the upper limit value and the lower limit value.

19. The method according to claim 18, wherein step (b) comprises setting the current prize value between the accumulated value and the upper limit value, and step (e) comprises setting the current prize value between the accumulated value and the lower limit value.

20. The method according to claim 18, further comprising displaying the accumulated value, the upper limit value, and the lower limit value.

21. The method according to claim 18, wherein step (b) comprises setting the accumulated value to the upper limit value, and step (e) comprises setting the accumulated value to the lower limit value.

22. The method according to claim 17, wherein step (a) comprises monitoring wagers from the multiple terminals, wherein each of the multiple terminals are executing games that are otherwise independent of one another.

23. The method according to claim 17, wherein step (c) comprises weighting the wagers.

24. The method according to claim 17, further comprising awarding the first and second prize values to players associated with the identified terminals.

25. The method according to claim 16, wherein the threshold is equal to the current prize value and step (c) comprises incrementing the accumulated value until the accumulated value is equal to the current prize value.

26. The method according to claim 16, wherein the threshold is equal to the current prize value and step (c) comprises incrementing the accumulated value until the accumulated value is beyond the current prize value.

* * * * *